US012770853B2

(12) United States Patent
Uchida

(10) Patent No.: US 12,770,853 B2
(45) Date of Patent: Oct. 20, 2026

(54) MASS SPECTROMETER

(71) Applicant: SHIMADZU CORPORATION, Kyoto (JP)

(72) Inventor: Takeshi Uchida, Kyoto (JP)

(73) Assignee: SHIMADZU CORPORATION (JP)

( * ) Notice: Subject to any disclaimer, the term of this patent is extended or adjusted under 35 U.S.C. 154(b) by 303 days.

(21) Appl. No.: 18/791,500

(22) Filed: Aug. 1, 2024

(65) Prior Publication Data

US 2025/0046594 A1 Feb. 6, 2025

(30) Foreign Application Priority Data

Aug. 3, 2023 (JP) ................................ 2023-126897

(51) Int. Cl.
*H01J 49/06* (2006.01)
*H01J 49/02* (2006.01)
*H01J 49/42* (2006.01)

(52) U.S. Cl.
CPC .......... *H01J 49/067* (2013.01); *H01J 49/022* (2013.01); *H01J 49/4215* (2013.01)

(58) Field of Classification Search
CPC .......... H01J 49/00; H01J 49/02; H01J 49/067; H01J 49/022; H01J 49/4215; H01J 49/063; H01J 49/068; G01N 30/02; G01N 30/06
USPC ........................................ 250/281, 282, 288
See application file for complete search history.

(56) References Cited

U.S. PATENT DOCUMENTS

2002/0005480 A1* 1/2002 Harada ............... H01J 49/4215
250/288
2021/0183638 A1* 6/2021 Nishiguchi ........... H01J 49/421

FOREIGN PATENT DOCUMENTS

JP 4692627 B2 6/2011

* cited by examiner

*Primary Examiner* — Jason L McCormack
(74) *Attorney, Agent, or Firm* — Muir Patent Law, PLLC

(57) ABSTRACT

The mass spectrometer includes a vacuum chamber, an ion source, a sample introduction tube, a lens optical system, and a feed-through connector. A first unit of the lens optical system is movable relative to the sample introduction tube in the connection direction, and the second unit and the third unit are movable relative to the first unit in the orthogonal direction. The first connection piece has a first bias portion that contacts the first terminal and biases the first terminal in the connection direction. The second connection piece has a second bias portion that contacts the second terminal and biases the second terminal in the orthogonal direction. The third connection piece has a third bias portion that contacts the third terminal and biases the third terminal in the orthogonal direction.

3 Claims, 5 Drawing Sheets

MASS SPECTROMETER

CROSS REFERENCE TO RELATED APPLICATIONS

This non-provisional application is based on Japanese Patent Application No. 2023-126897 filed on Aug. 3, 2023 with the Japan Patent Office, the entire contents of which are hereby incorporated by reference.

BACKGROUND OF THE INVENTION

Field of the Invention

The present invention relates to a mass spectrometer.

Description of the Background Art

For example, there is known a mass spectrometer such as that disclosed in Japanese Patent No. 4692627. The mass spectrometer includes a vacuum chamber, an ion source, a lens optical system, a quadrupole mass filter, and an ion detector. A voltage is applied to the lens optical system from a voltage application unit provided outside the vacuum chamber.

SUMMARY OF THE INVENTION

In the mass spectrometer disclosed in Japanese Patent No. 4692627, in order to establish an electrical connection between the voltage application unit and the lens optical system, a feed-through connector is usually attached to the vacuum chamber, and each terminal of the feed-through connector is connected to the lens optical system by electrical wires. In this case, for example, it is required to attach and detach the electrical wires during maintenance of the lens optical system.

An object of the present invention is to provide a mass spectrometer capable of simplifying the operation of attaching or detaching a lens optical system and a feedthrough connector.

A mass spectrometer according to one aspect of the present invention includes: a vacuum chamber; an ion source that is disposed in the vacuum chamber and ionizes sample molecules contained in a sample gas; a sample introduction tube that introduces the sample gas outside the vacuum chamber into the ion source; a lens optical system that draws ions generated by the ion source outside the ion source; and a feed-through connector that connects a voltage application unit which is provided outside the vacuum chamber and applies a voltage to the lens optical system and the lens optical system to each other. The lens optical system includes: a first unit that includes a first lens and is connected to the sample introduction tube; a first connection piece that connects the first unit and the feed-through connector; a second unit that includes a second lens; a second connection piece that connects the second unit and the feed-through connector; a third unit that includes a third lens; and a third connection piece that connects the third unit and the feed-through connector. The first unit is movable relative to the sample introduction tube in a connection direction in which the ion source is connected to the sample introduction tube, the second unit and the third unit are movable relative to the first unit in an orthogonal direction orthogonal to the connection direction. The feed-through connector includes: a first terminal that contacts the first connection piece; a second terminal that contacts the second connection piece; and a third terminal that contacts the third connection piece. The first connection piece has a first bias portion that contacts the first terminal and biases the first terminal at least in the connection direction, the second connection piece has a second bias portion that contacts the second terminal and biases the second terminal at least in the orthogonal direction, and the third connection piece has a third bias portion that contacts the third terminal and biases the third terminal at least in the orthogonal direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
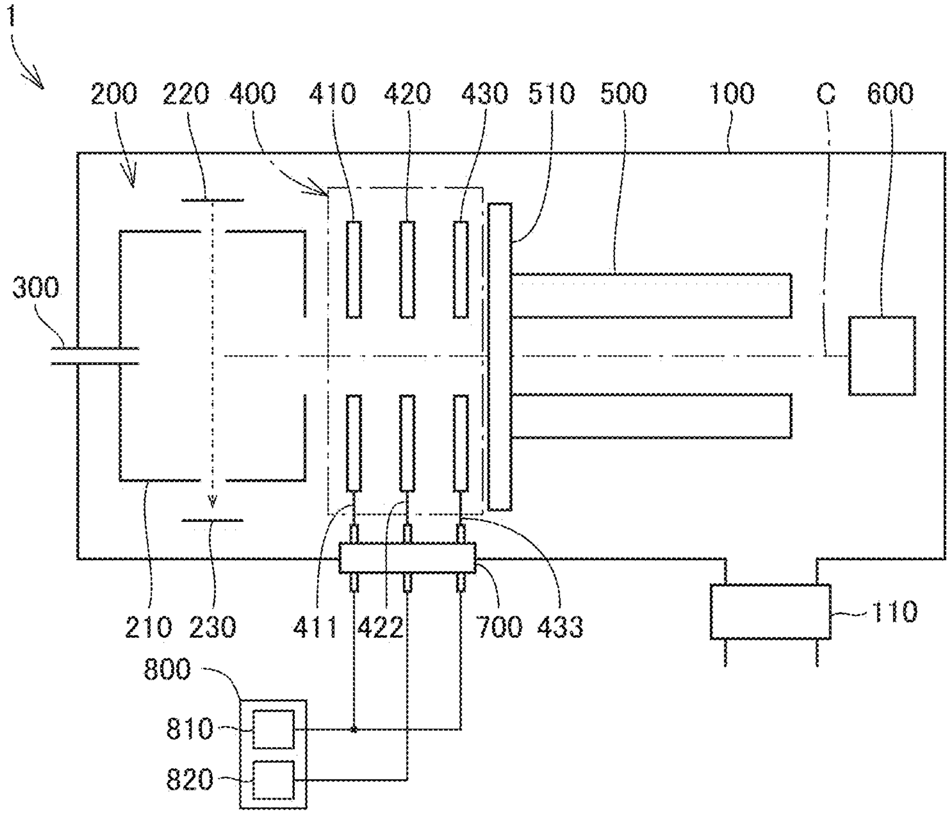
FIG. 1 is a view schematically illustrating a mass spectrometer according to an embodiment of the present invention.

Embodiments of the present invention will be described with reference to the drawings. In the following description of the drawings, the same or corresponding members are denoted by the same reference numerals.

Figure 2:
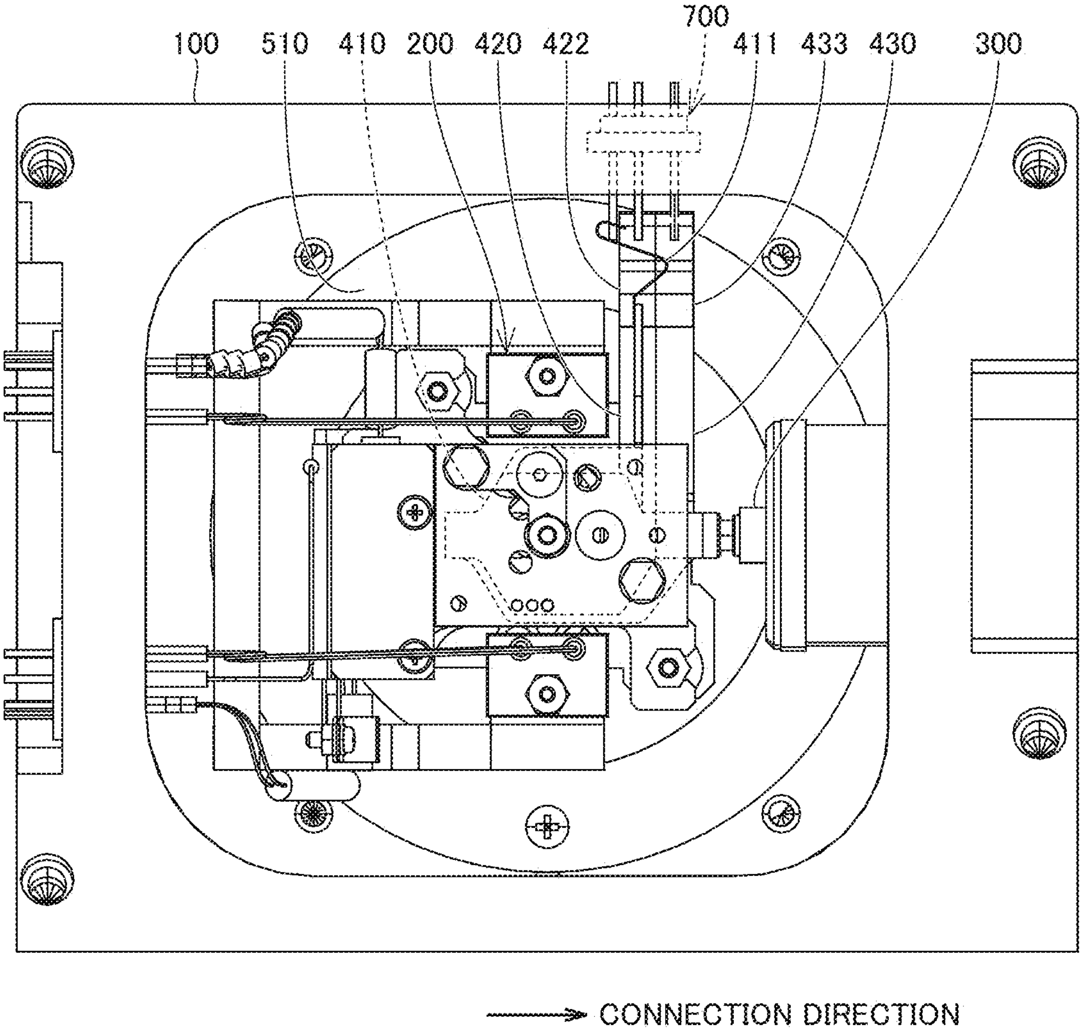
FIG. 2 is a front view schematically illustrating the mass spectrometer.

FIG. 1 is a view schematically illustrating a mass spectrometer 1 according to an embodiment of the present invention. FIG. 2 is a front view schematically illustrating the mass spectrometer 1. The mass spectrometer 1 is a device for analyzing a mass of a sample by ionizing molecules or atoms of the sample. The mass spectrometer 1 is preferably used in a gas chromatograph or the like.

As illustrated in FIGS. 1 and 2, the mass spectrometer 1 includes a vacuum chamber 100, an ion source 200, a sample introduction tube 300, a lens optical system 400, a quadrupole mass filter 500, an ion detector 600, a feed-through connector 700, and a voltage application unit 800.

The vacuum chamber 100 is provided with a vacuum pump 110 that evacuates the vacuum chamber 100. The ion source 200, the lens optical system 400, the quadrupole mass filter 500, and the ion detector 600 are disposed in the vacuum chamber 100 along an ion optical axis C (see FIG. 1).

The ion source 200 ionizes sample molecules contained in a sample gas. The ion source 200 includes an ionization chamber 210, a filament 220, a trap electrode 230, and the like. A sample introduction tube 300 for introducing a sample gas outside the vacuum chamber 100 (from a gas chromatography) into the ionization chamber 210 is connected to the ionization chamber 210.

The ions generated in the ionization chamber 210 are guided outside the ionization chamber 210 by the lens optical system 400, separated in the quadrupole mass filter

500 disposed downstream of the lens optical system 400 according to a mass-to-charge ratio, and detected in the ion detector 600.

The lens optical system 400 is disposed downstream of the ion source 200, and configured to draw the ions generated in the ionization chamber 210 outside the ionization chamber 210. The lens optical system 400 includes a first unit 410 including a first lens, a second unit 420 including a second lens, a third unit 430 including a third lens, a first connection piece 411, a second connection piece 422, and a third connection piece 433.

The first unit 410 is disposed downstream of the ionization chamber 210, the second unit 420 is disposed downstream of the first unit 410, and the third unit 430 is disposed downstream of the second unit 420. The lens in each of the units 410 to 430 defines a flow path of ions (the ion optical axis C).

From the viewpoint of preventing contaminations derived from the sample from adhering to the first lens, the first unit 410 is fixed to the ionization chamber 210, and is subjected to temperature adjustment together with the ionization chamber 210. The first unit 410 is movable relative to the sample introduction tube 300 in the longitudinal direction of the sample introduction tube 300 (the left-right direction in FIG. 2) together with the ionization chamber 210.

The second unit 420 and the third unit 430 are fixed to each other. The second unit 420 and the third unit 430 are movable relative to the first unit 410 in an orthogonal direction (a direction orthogonal to the paper surface in FIG. 2) orthogonal to a connection direction (a left-right direction in FIG. 2) in which the first unit 410 is connected to the sample introduction tube 300. The quadrupole mass filter 500 has a partition wall 510 (see FIGS. 1 and 2) formed in a disk shape, and the second unit 420 and the third unit 430 are fitted to a central portion of the partition wall 510 so as to be coaxial with the central axis of the quadrupole mass filter 500. The quadrupole mass filter 500 is disposed on the back side of the paper surface in FIG. 2 (the right side in FIG. 3).

A voltage is applied to each of the first unit 410 to the third unit 430 from the voltage application unit 800 provided outside the vacuum chamber 100. Specifically, a base voltage is applied to the first unit 410 and the third unit 430 from a base voltage generation section 810 in the voltage application unit 800, and an adjustment voltage is applied to the second unit 420 from an adjustment voltage generation section 820 in the voltage application unit 800. The base voltage is a voltage that draws ions from the ionization chamber 210, and the adjustment voltage is a voltage that repels the ions (i.e., a voltage that has a polarity opposite to that of the base voltage).

The first connection piece 411 is connected to the first unit 410 by welding or the like. The first connection piece 411 connects the first unit 410 and the feed-through connector 700.

The second connection piece 422 is connected to the second unit 420 by welding or the like. The second connection piece 422 connects the second unit 420 and the feed-through connector 700.

The third connection piece 433 is connected to the third unit 430 by welding or the like. The third connection piece 433 connects the third unit 430 and the feed-through connector 700.

Figure 3:
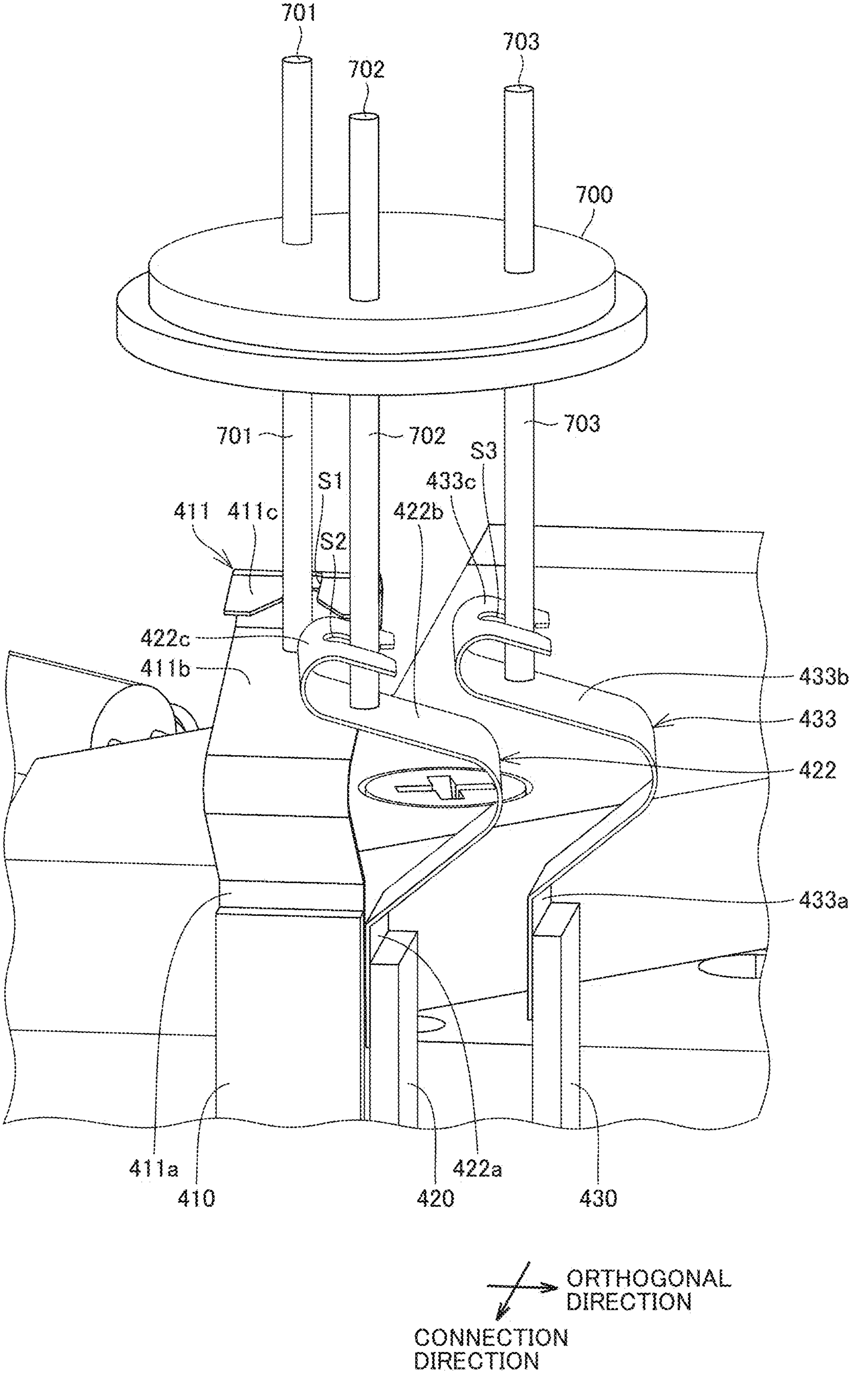
FIG. 3 is a perspective view illustrating each connection piece and a feed-through connector.

The feed-through connector 700 connects the voltage application unit 800 and the lens optical system 400 to each other. The feed-through connector 700 is connected to the vacuum chamber 100. As illustrated in FIG. 3, the feed-through connector 700 includes a first terminal 701, a second terminal 702, and a third terminal 703.

The first terminal 701 contacts the first connection piece 411. The second terminal 702 contacts the second connection piece 422. The third terminal 703 contacts the third connection piece 433. The first terminal 701 and the third terminal 703 are connected to the base voltage generation section 810, and the second terminal 702 is connected to the adjustment voltage generation section 820.

Figure 4:
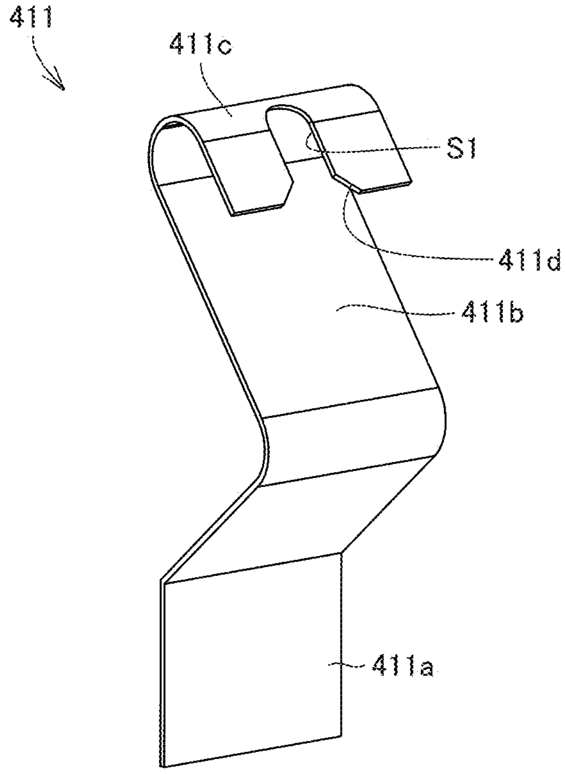
FIG. 4 is a perspective view illustrating a first connection piece.

As illustrated in FIGS. 3 and 4, the first connection piece 411 includes a first base end portion 411*a*, a first bias portion 411*b*, and a first guide portion 411*c*.

The first base end portion 411*a* is connected to the first unit 410. The first base end portion 411*a* is formed in a plate shape.

The first bias portion 411*b* is connected to the first base end portion 411*a*. The first bias portion 411*b* contacts the first terminal 701 and biases the first terminal 701 at least in the connection direction. In other words, the first bias portion 411*b* contacts the first terminal 701, and applies a biasing force that includes a component for biasing the first terminal 701 in the connection direction to the first terminal 701. In the present embodiment, the first bias portion 411*b* contacts the first terminal 701 and biases the first terminal 701 in both the connection direction and the longitudinal direction of the first terminal 701 (the vertical direction in FIG. 2). The first bias portion 411*b* is bent so as to be convex in the connection direction.

The first guide portion 411*c* is connected to a distal end of the first bias portion 411*b*. The first guide portion 411*c* guides the first terminal 701 when connecting the first unit 410 to the sample introduction tube 300. The first guide portion 411*c* is bent so as to be convex in a direction opposite to the bending direction of the first bias portion 411*b*. An end portion of the first guide portion 411*c* is formed with a first slit S1 for receiving the first terminal 701. The first slit S1 extends in the connection direction. As illustrated in FIG. 4, the end portion of the first guide portion 411*c* is formed with a first tapered portion 411*d*. The first tapered portion 411*d* gradually widens toward the open end of the first slit S1.

In the present embodiment, the first connection piece 411, the second connection piece 422, and the third connection piece 433 are formed in the same shape. In other words, the second connection piece 422 includes a second base end portion 422*a*, a second bias portion 422*b* and a second guide portion 422*c*, and the third connection piece 433 includes a third base end portion 433*a*, a third bias portion 433*b* and a third guide portion 433*c*.

As illustrated in FIGS. 2 and 3, the bending direction of the second bias portion 422*b* and the bending direction of the third bias portion 433*b* are orthogonal to the bending direction of the first bias portion 411*b*. In other words, the second bias portion 422*b* contacts the second terminal 702 and biases the second terminal 702 in both the orthogonal direction and the longitudinal direction of the second terminal 702, and the third bias portion 433*b* contacts the third terminal 703 and biases the third terminal 703 in both the orthogonal direction and the longitudinal direction of the third terminal 703. The extending direction of a second slit S2 formed in the second guide portion 422*c* and the extending direction of a third slit S3 formed in the third guide portion 433*c* are orthogonal to the extending direction of the first slit S1.

In the mass spectrometer 1 described above, since the first unit 410 can be moved independently of the second unit 420 and the third unit 430 when installing the lens optical system 400 in the vacuum chamber 100, it is possible to hermetically connect the ion source 200, which can be moved together with the first unit 410, to the sample introduction tube 300.

Figure 5:
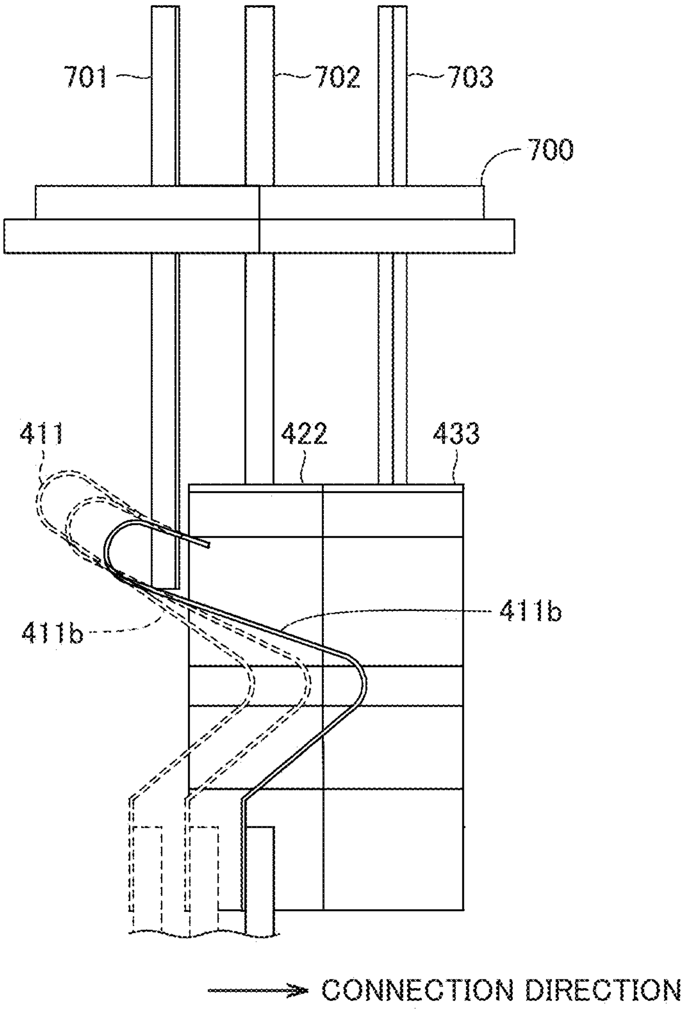
FIG. 5 is a view schematically illustrating a change in the shape of the first connection piece during the installation of a first unit.

As illustrated in FIG. 5, the first bias portion 411*b* contacts the first terminal 701 while sliding with respect to the first terminal 701. Thus, the surface of the first bias portion 411*b* can be cleaned by the end portion of the first terminal 701. As a result, a contact failure between the first bias portion 411*b* and the first terminal 701 caused by a foreign matter (dust or the like) is suppressed. In FIG. 5, the first connection piece 411 before the installation is completed is indicated by a broken line.

By pushing the second unit 420 and the third unit 430 toward the quadrupole mass filter 500 in the orthogonal direction, the second connection piece 422 contacts the second terminal 702 with the second bias portion 422*b* biasing the second terminal 702, and the third connection piece 433 contacts the third terminal 703 with the third bias portion 433*b* biasing the third terminal 703. At this time, the cleaning action caused by the second terminal 702 and the third terminal 703 is similar to that of the first terminal 701. Thus, the second unit 420 and the third unit 430 are fitted to the partition wall 510 and arranged to be coaxial with the central axis of the quadrupole mass filter 500.

As described above, in the mass spectrometer 1 according to the present embodiment, when installing the first unit 410 to the third unit 430 of the lens optical system 400 in the vacuum chamber 100, the first bias portion 411*b* of the first connection piece 411 contacts the first terminal 701 and biases the first terminal 701 in the connection direction, the second bias portion 422*b* of the second connection piece 422 contacts the second terminal 702 and biases the second terminal 702 in the orthogonal direction, and the third bias portion 433*b* of the third connection piece 433 contacts the third terminal 703 and biases the third terminal 703 in the orthogonal direction. Thus, it is possible to omit the electrical wires as in the prior art, which simplifies the operation of attaching or detaching the lens optics 400 and the feed-through connector 700.

Aspects

It will be understood by those skilled in the art that the exemplary embodiments described above are specific examples of the following aspects.

(First Aspect) The mass spectrometer according to one aspect includes:

a vacuum chamber;

an ion source that is disposed in the vacuum chamber and ionizes sample molecules contained in a sample gas;

a sample introduction tube that introduces the sample gas outside the vacuum chamber into the ion source;

a lens optical system that draws ions generated by the ion source outside the ion source; and a feed-through connector that connects a voltage application unit which is provided outside the vacuum chamber and applies a voltage to the lens optical system and the lens optical system to each other, wherein the lens optical system includes:

a first unit that includes a first lens and is connected to the sample introduction tube;

a first connection piece that connects the first unit and the feed-through connector;

a second unit that includes a second lens;

a second connection piece that connects the second unit and the feed-through connector;

a third unit that includes a third lens; and a third connection piece that connects the third unit and the feed-through connector, the first unit is movable relative to the sample introduction tube in a connection direction in which the ion source is connected to the sample introduction tube, the second unit and the third unit are movable relative to the first unit in an orthogonal direction orthogonal to the connection direction, the feed-through connector includes:

a first terminal that contacts the first connection piece;

a second terminal that contacts the second connection piece; and a third terminal that contacts the third connection piece, the first connection piece has a first bias portion that contacts the first terminal and biases the first terminal at least in the connection direction, the second connection piece has a second bias portion that contacts the second terminal and biases the second terminal at least in the orthogonal direction, and the third connection piece has a third bias portion that contacts the third terminal and biases the third terminal at least in the orthogonal direction.

In the mass spectrometer, when installing each unit of the lens optical system in the vacuum chamber, the first bias portion of the first connection piece contacts the first terminal and biases the first terminal in the connection direction, the second bias portion of the second connection piece contacts the second terminal and biases the second terminal in the orthogonal direction, and the third bias portion of the third connection piece contacts the third terminal and biases the third terminal in the orthogonal direction. Thus, it is possible to omit the electrical wires as in the prior art, which simplifies the operation of attaching or detaching the lens optics and the feedthrough connector.

Further, since the first unit can be moved independently of the second unit and the third unit, it is possible to easily position each unit.

(Second Aspect) In the mass spectrometer according to the first aspect, the first connection piece further includes a first guide portion connected to a distal end of the first bias portion, the first guide portion has a first slit that extends in the connecting direction, the second connection piece further includes a second guide portion connected to a distal end of the second bias portion, the second guide portion has a second slit that extends in the orthogonal direction, the third connection piece further includes a third guide portion connected to a distal end of the third bias portion, and the third guide portion has a third slit that extends in the orthogonal direction.

According to the mass spectrometer of the second aspect, since the first slit receives the first terminal when installing the first unit in the connection direction, the second slit receives the second terminal and the third slit receives the third terminal when installing the second unit and the third unit in the orthogonal direction, it is possible to effectively determine the position between each terminal and each connection piece.

(Third Aspect) The mass spectrometer according to the first or second aspect further includes a quadrupole mass filter disposed downstream of the lens optical system, and it is preferable that the quadrupole mass filter has a partition wall, the first unit is fixed to the ion source, and is subjected to temperature adjustment together with the ion source, and the second unit and the third unit are fixed to each other and fitted to the partition wall so as to be coaxial with a central axis of the quadrupole mass filter.

According to the mass spectrometer of the third aspect, the contaminations derived from the sample are prevented from adhering to the first lens, and the second lens and the third lens are disposed so as to be coaxial with the central axis of the quadrupole mass filter.

Although the embodiments of the present invention have been described, it should be understood that the embodiments disclosed herein are illustrative and non-restrictive in all respects. It is intended that the scope of the present invention is not limited to the description above but defined by the scope of the claims and encompasses all modifications equivalent in meaning and scope to the claims.

What is claimed is:

1. A mass spectrometer comprising:

a vacuum chamber;

an ion source that is disposed in the vacuum chamber and ionizes sample molecules contained in a sample gas;

a sample introduction tube that introduces the sample gas outside the vacuum chamber into the ion source;

a lens optical system that draws ions generated by the ion source outside the ion source; and a feed-through connector that connects a voltage application unit which is provided outside the vacuum chamber and applies a voltage to the lens optical system and the lens optical system to each other, wherein the lens optical system includes:

a first unit that includes a first lens and is connected to the sample introduction tube;

a first connection piece that connects the first unit and the feed-through connector;

a second unit that includes a second lens;

a second connection piece that connects the second unit and the feed-through connector;

a third unit that includes a third lens; and a third connection piece that connects the third unit and the feed-through connector, the first unit is movable relative to the sample introduction tube in a connection direction in which the ion source is connected to the sample introduction tube, the second unit and the third unit are movable relative to the first unit in an orthogonal direction orthogonal to the connection direction, the feed-through connector includes:

a first terminal that contacts the first connection piece;

a second terminal that contacts the second connection piece; and a third terminal that contacts the third connection piece, the first connection piece has a first bias portion that contacts the first terminal and biases the first terminal at least in the connection direction, the second connection piece has a second bias portion that contacts the second terminal and biases the second terminal at least in the orthogonal direction, and the third connection piece has a third bias portion that contacts the third terminal and biases the third terminal at least in the orthogonal direction.

2. The mass spectrometer according to claim 1, wherein the first connection piece further includes a first guide portion connected to a distal end of the first bias portion, the first guide portion has a first slit that extends in the connecting direction, the second connection piece further includes a second guide portion connected to a distal end of the second bias portion, the second guide portion has a second slit that extends in the orthogonal direction, the third connection piece further includes a third guide portion connected to a distal end of the third bias portion, and the third guide portion has a third slit that extends in the orthogonal direction.

3. The mass spectrometer according to claim 1, further comprising:

a quadrupole mass filter disposed downstream of the lens optical system, wherein the quadrupole mass filter has a partition wall, the first unit is fixed to the ion source, and is subjected to temperature adjustment together with the ion source, and the second unit and the third unit are fixed to each other and fitted to the partition wall so as to be coaxial with a central axis of the quadrupole mass filter.

* * * * *